Jan. 11, 1949.   S. RUBEN   2,458,878
ALKALINE PRIMARY CELL
Filed June 26, 1945
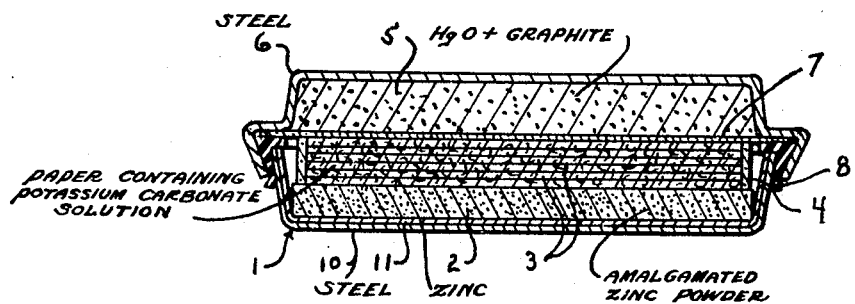
INVENTOR.
Samuel Ruben
BY Chester F. Carlson Patented Jan. 11, 1949

2,458,878

UNITED STATES PATENT OFFICE 2,458,878

ALKALINE PRIMARY CELL

Samuel Ruben, New Rochelle, N. Y.

Application June 26, 1945, Serial No. 601,626

7 Claims. (Cl. 136—107)

This invention relates to alkaline primary cells, particularly alkaline dry cells.

The object of the invention is to produce an improved dry cell.

A further object of the invention is the provision of a dry cell capable of withstanding long shelf life without deterioration.

Another object is the provision of a dry cell having an hygroscopic electrolyte.

Other objects will be apparent as the disclosure proceeds.

The figure of the drawing is a sectional view of an alkaline dry cell of the invention.

My improved dry cell utilizes an alkaline salt which when dissolved in water hydrolyzes and forms an alkaline electrolyte. The preferred materials are the carbonates of potassium, sodium, lithium, caesium and rubidium of which potassium carbonate is most desirable in relation to cost and performance.

When potassium carbonate is dissolved in water, hydrolysis occurs as follows:

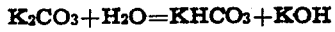

$$K_2CO_3 + H_2O = KHCO_3 + KOH$$

The electrolyte is hygroscopic and tends to hold its moisture content without the addition of other moisture retainer elements.

The anode of the cell is formed from amalgamated zinc.

The cathode comprises an electronically conductive body containing an oxygen-yielding compound. Suitable compounds are for example, mercuric oxide, silver oxide, cupric oxide, cuprous oxide, lead peroxide, potassium permanganate, calcium permanganate, silver permanganate and copper permanganate. Other oxygen yielding compounds having a relatively low heat of formation and hence low decomposition potential may also be used.

Most of the oxygen-yielding compounds mentioned are too low in electric conductivity to be used alone as a conductive cathode and hence it is usually necessary to mix with them a conductive ingredient in as intimate contact as possible. The preferred ingredient is graphite although other finely-divided conductive materials such as silver, iron, and the like may be used where they do not result in deleterious local reactions. If the oxygen-yielding compound is sufficiently conductive itself, an added conductor may not be necessary. For example, silver oxide has sufficient conductivity to be used in the pure state as a cathode for some applications.

Where graphite is used, micronized natural graphite, such as Madagascar, Mexican or Ceylon graphite, has been found to give the best results. It can be used in various proportions, the most useful cathodes containing from 1% to 50% graphite, with 5 to 15% graphite being preferred. The micronized graphite has an extremely small particle size, in the order of 5 to 10 microns diameter. The graphite and finely powdered oxygen compound are thoroughly mixed to form a graphite coating on the compound particles and the material is pressed into a pellet which is then usually pressed into the bottom of a container under high pressure, such as 20,000 pounds per square inch to produce a coherent conduction cathode of low porosity.

In the drawing the container 1 is formed from a zinc-steel bimetal, comprising an external steel layer 10 and an internal zinc layer 11. The thickness of each metal being approximately the same. The anode 2 which rests upon and makes contact with the zinc side of the container is a compressed pellet of amalgamated zinc powder containing about .05% lead and about .002% cadmium. Spacer 3, housed in polystyrene ring 4 is composed of six discs of .010" thick Dexter paper, a porous high purity paper, impregnated with an electrolyte solution made by dissolving 80 grams of potassium carbonate in 100 ml. of water. The concentration may be varied within the range of 30 to 100 grams of potassium carbonate to 100 ml. of water. After impregnation the spacer is drained of free-flowing electrolyte.

The cathode-depolarizer 5 consists of a compressed pellet 90% red mercuric oxide and 10% micronized graphite housed within steel can top 6 with which it makes contact. A three mil thick disc 7 of plasticized polyvinyl alcohol is interposed between spacer 3 and cathode 5 and acts as a barrier to prevent migration of deleterious particles. The bimetal zinc steel container and the steel can top which serve as terminals of the cell are insulated from each other by neoprene grommet ring 8 of L-shaped cross-section which rests on the container and against which the top is spun down so as to seal the cell. In the assembly of the cell the paper spacer is compressed about 10% to allow adequate continuous contact.

In place of the Dexter paper other suitable porous materials may be used such as nylon, polyfibre (polystyrene fibre sheets), etc. Also other methods may be used to immobilize the electrolyte as by the addition of suitable gels etc. While polyvinyl alcohol sheet is the preferred barrier other suitable materials may be used such as pressed discs of magnesium silicate, magnesium hydroxide powder, pressed ceramic, and the like. For the most efficient barrier effect it is desirable that the pores of the barrier should be so small that fine particles of graphite can not pass through them and so that the migration of dissolved compounds to the anode is inhibited or prevented.

The cell of this invention is particularly useful in applications where the required current is of low magnitude, such as in grid bias circuits, "B" batteries for hearing aids, and the like, and provides long life with freedom from internal action. A typical cell using a cathode-depolarizer of 90% red mercuric oxide 10% micronized graphite has an E. M. F. of 1.42 volts.

What is claimed is:

1. A dry cell comprising a container, an amalgamated zinc anode therein, a coherent conductive cathode therein comprising an electrolytically reducible oxygen-yielding compound, and an electrolyte between and in contact with said anode and cathode predominantly comprising an aqueous solution of an alkali metal carbonate.

2. A primary cell comprising an amalgamated zinc anode, a coherent conductive cathode comprising an electrolytically reducible oxygen-yielding compound, and an electrolyte between and in contact with said anode and cathode predominantly comprising an aqueous solution of an alkali metal carbonate.

3. A dry cell comprising an amalgamated zinc anode, a coherent conductive cathode comprising an electrolytically reducible oxygen-yielding compound, a porous spacer between said anode and cathode, and an electrolyte predominantly comprising an aqueous solution of an alkali metal carbonate in said spacer.

4. A dry cell comprising an amalgamated zinc anode, a coherent conductive cathode comprising an electrolytically reducible oxygen-yielding compound, an immobilized electrolyte predominantly comprising an aqueous solution of an alkali metal carbonate between and in contact with said anode and cathode, and a minutely porous barrier layer covering the electrolyte-engaging surface of said cathode.

5. A dry cell comprising an amalgamated zinc anode, a coherent conductive cathode comprising finely divided mercuric oxide intimately mixed with graphite, and an electrolyte between and in contact with said anode and cathode predominantly comprising an aqueous solution of potassium carbonate.

6. A dry cell comprising an amalgamated zinc anode, a coherent conductive cathode comprising finely divided mercuric oxide intimately mixed with graphite, and an electrolyte between and in contact with said anode and cathode predominantly comprising an aqueous solution of potassium carbonate, said solution being immobilized, and a minutely porous barrier layer covering the electrolyte-engaging surface of said cathode.

7. The cell as described in claim 1 characterized in that the electrolyte is gelled.

SAMUEL RUBEN.

REFERENCES CITED

The following references are of record in the file of this patent:

UNITED STATES PATENTS

| Number | Name | Date |
|---|---|---|
| 585,855 | Sully | July 6, 1897 |
| Re. 21,100 | Greger | May 30, 1939 |

FOREIGN PATENTS

| Number | Country | Date |
|---|---|---|
| 380,707 | France | Oct. 17, 1907 |

OTHER REFERENCES

Publication—Crennell and Lea, Alkaline Accumulators (1928), page 22.